United States Patent Office.

EGBERT MARSH AND EDWARD W. MARSH, OF BRIDGEPORT, CONNECTICUT.

PLASTIC COMPOUND TO BE USED AS A STUCCO.

SPECIFICATION forming part of Letters Patent No. 321,621, dated July 7, 1885.

Application filed October 10, 1884. (No specimens.)

*To all whom it may concern:*

Be it known that we, EGBERT MARSH and EDWARD W. MARSH, citizens of the United States, residing at Bridgeport, in the county of Fairfield and State of Connecticut, have invented a new and useful Plastic Compound to be Used as a Stucco; and we do hereby declare the following to be a full, clear, and exact description of the invention, such as will enable others skilled in the art to which it appertains to make and use the same.

Our invention relates to the compounding or mixing of stucco or plaster for the outer or final coating of walls, and for other analogous purposes; and it consists in the discovery of the properties of the resin-lac when used in solution in connection with calcined gypsum, and in the composition itself, in which the peculiar qualities of the lac are utilized to delay the setting of the stucco for any predetermined length of time, and to give it greater hardness and ability to resist the action of moisture.

In carrying out our invention we mix the ingredients in proportions substantially as follows—viz., solution of lac, seven to ten gallons, and calcined gypsum, one hundred pounds. The lac used may be in any of the forms known to commerce, as shellac, stick-lac, seed-lac, button-lac, lump-lac, plate-lac, &c.; but we preferably use the grade known to the trade as "orange-shellac." It may be dissolved by boiling it with one-half the quantity by weight of caustic soda. For example, put twenty ounces lac and ten ounces caustic soda in four gallons of water and boil. Other well-known solvents of lac may be used, if preferred. In stating the quantity of solution of lac required in mixing one hundred pounds of calcined gypsum we have given two extremes, one of which will make a stiff stucco, and the other a stucco as thin as can conveniently be laid with a trowel. It will of course be understood by all who are familiar with the mixing and laying on of stuccos that the stiffness of the composition must necessarily vary with the circumstances or place where it is to be used. For example, a stucco for top walls is usually made stiffer than for side walls. For ordinary purposes we have found a composition consisting of nine gallons solution of lac to one hundred pounds calcined gypsum to work best under the trowel.

We have made numerous experiments with a view of determining what strength of solution of lac would effect the best general results and what these results were. In these experiments we have varied the strength of the solution of lac from one half ounce to the gallon to two ounces to the gallon as a maximum. It may be stated, generally, that we have discovered as the results of our experiments three novel and extremely valuable properties of lac when used in solution in connection with calcined gypsum. First, it retards the setting of the gypsum; so accurately may this be regulated that by varying the strength of the lac solution stuccos may be mixed that (within two or three hours) will set within fifteen or twenty minutes of any predetermined time; secondly, it renders the stucco when thoroughly dried much harder than the original gypsum in the rock; the hardness of the stucco will of course, within certain limits, vary with the strength of the lac solution; and, thirdly, the lac being itself insoluble in water, it greatly increases the ability of the stucco to withstand the action of moisture.

We are well aware that glue, soap, sour beer, &c., have been used in varying proportions in compounds of calcined gypsum for the purpose of retarding the setting of the gypsum. None of these substances, however, act to render the stucco harder when dried, and some of them—for example, glue—are remarkable for their property of absorbing water. This being a well-known property of gypsum itself, it follows that the addition of other substances of a similar nature will not improve stucco compositions for general use.

It is of course well known to those familiar with the use of calcined gypsum that a mixture of calcined gypsum and water will harden almost instantly, and will set quite hard within eight minutes. By using lac in the proportion of one-half ounce to the gallon of water we have found that the setting of the composition will be delayed to from forty to fifty minutes from the mixing. In a composition in which the solution of lac used was in the proportion of two ounces to the gallon, thorough setting did not take place under three hours, while in a composition in which the lac solution used was in the proportion of one ounce to the gallon, the setting of the composition took place in about one and one-fourth hour. As the general result of our experiments, we recommend the use of a lac solution of one ounce to the gallon, having found it to give perfectly satisfactory results under all circumstances.

In compositions of this nature it is quite common to use white sand, silica, marble-dust, &c., in connection with the gypsum. This we have done with perfect success, using the sand or other substance in about the proportion of one pound to five pounds of calcined gypsum.

The rough coat upon which our improved stucco is laid forms no part of our present invention. Any ordinary lime or gypsum plaster may be used. We preferably, however, use the gypsum and lac plaster described and claimed in our other application, Serial No. 145,202, filed October 10, 1884.

Where colored walls are desired, we recommend that the coloring-matter be incorporated with the composition at the time of mixing.

As a modification of our present invention we have found that the composition as described above, reduced with sufficient water to bring it to about the consistency of ordinary calcimine or whitewash, will make a coating for finished walls equal in every respect to ordinary grades of paint, and at no greater expense than ordinary whitewash, and at less expense than calcimine. The surface produced is perfectly smooth, harder than any heretofore produced, except paint, and extremely valuable on account of its ability to resist the action of moisture. We have found by actual experiment that the use of water upon walls having this finish had no perceptible effect upon them, and, furthermore, that the finish will under no circumstances peel or crack off.

Having thus described our invention, we claim—

The herein-described compound for finishing walls and analogous purposes, consisting of calcined gypsum and water, in substantially the proportions stated, with the addition thereto, as a means of controlling the setting and rendering the compound hard and able to withstand the action of moisture, of the resin-lac, in substantially the proportions stated, dissolved in solution of caustic soda.

In testimony whereof we affix our signatures in presence of two witnesses.

EGBERT MARSH.
EDWARD W. MARSH.

Witnesses:
  HELEN MARSH,
  A. M. WOOSTER.